G. A. SLEIGHT.
SANITARY SCREEN.
APPLICATION FILED OCT. 11, 1916.
1,208,675. Patented Dec. 12, 1916.
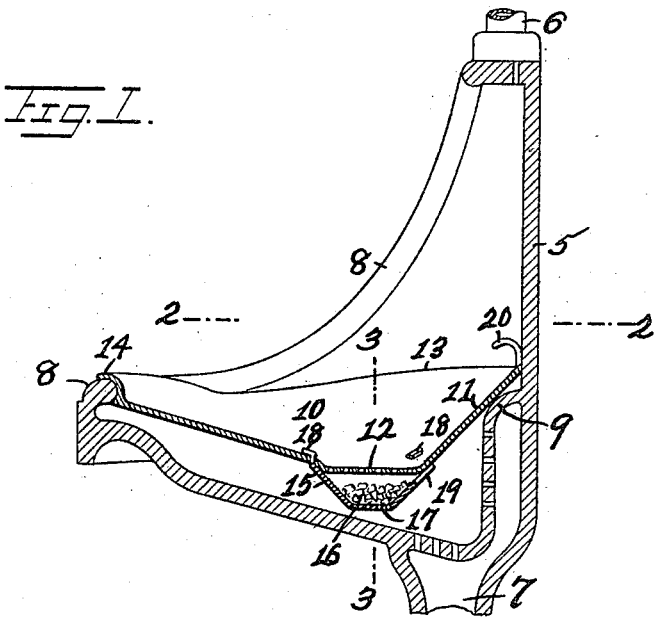
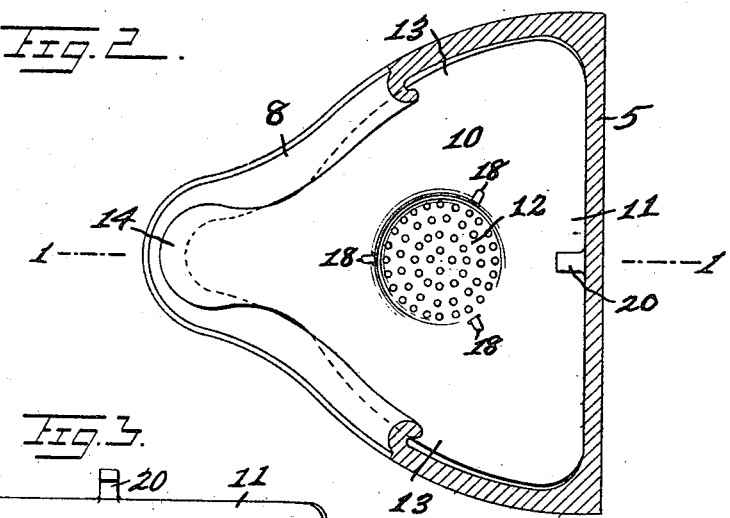
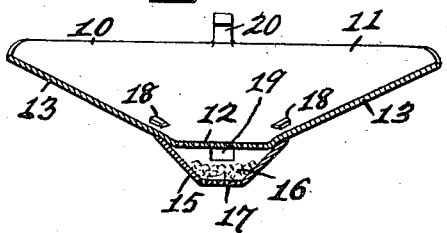
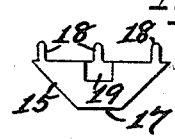
WITNESSES
H. T. Walker
J. O. Larsen
INVENTOR
G. A. Sleight
BY
ATTORNEYS

UNITED STATES PATENT OFFICE.

GEORGE A. SLEIGHT, OF HYDE PARK, NEW YORK.

SANITARY SCREEN.

1,208,675.  Specification of Letters Patent.  Patented Dec. 12, 1916.

Application filed October 11, 1916. Serial No. 124,998.

*To all whom it may concern:*

Be it known that I, GEORGE A. SLEIGHT, a citizen of the United States, and a resident of Hyde Park, in the county of Dutchess and State of New York, have invented certain new and useful Improvements in Sanitary Screens, of which the following is a specification.

My invention relates to sanitary screens for urinals, being an improvement over the form shown and described in Letters Patent of the United States issued to me on the 6th day of June, 1916, No. 1,186,345, and among the main distinctions are the provision of a disinfectant holder beneath the pan, the means for holding said holder in position, the pan arrangement partially over and partially under the nosing of the urinal to permit the removal of matter from the pan, and the means for ready removal of the pan from the urinal.

My invention is fully described in the following specification, of which the accompanying drawings form a part, in which like characters refer to like parts in each of the views, and in which:—

Figure 1 is a vertical section taken through a urinal provided with my invention, as on the line 1—1 of Fig. 2; Fig. 2 is a section taken on the line 2—2 of Fig. 1; Fig. 3 is a section taken on the line 3—3 of Fig. 1; and Fig. 4 is a detached view of the disinfectant holder removed from the pan.

Referring to the drawings, 5 represents a urinal having a feed water pipe 6, a drain pipe 7, and a nosing 8 around the upper edge thereof, all of the usual construction, the interior of the urinal being shown as provided with a member at the rear thereof forming a shoulder 9.

My invention consists of a pan 10 having a rear portion 11 sharply inclined downwardly and forwardly toward a substantially central perforated portion 12, side portions 13 and a front portion 14 also downwardly inclined to meet said perforated portion 12, all of said inclined portions being imperforate.

Arranged beneath the perforated portion 12 is a holder 15 for disinfectants 16 in a granular or lump form preferably, said holder having downwardly inclined sides converged to meet a central perforated portion 17 and being held to the pan 10 by means of tongues 18 passed upwardly through suitable slots in the pan and then angularly bent, and the rear of said holder is provided with an opening 19 to admit the disinfectant 16 when a new supply is required.

The side members 13 of the pan rest upon the curved interior of the urinal, beneath the nosing 8, whereas the front member 14 extends above said nosing and is preferably formed to fit the nosing, while the rear member 11 bears on the interior of the urinal and, in the urinal illustrated, upon the shoulder 9, close to the rear wall of the urinal to divert water from the pipe 6 to the disinfectant and, because of the relatively small perforated member 12, over the bottom of the pan formed by all of the inclined members, the side members 13 assisting in this water distribution.

Because of the front member 14 the upper surface of the pan may be cleansed and any matter thereon may be drawn forwardly and out of the pan, the front member presenting no obstruction to the refuse removal.

The rear pan member 11 is surmounted by a hook 20 forming a handle whereby said pan may be readily lifted out of the urinal by means of a finger of a porter inasmuch as nothing ever touches this hook other than the clean water from the pipe 6, and all water entering the urinal must pass through the disinfectant before it can escape down the drain pipe 7.

While I have shown my invention applied to one form of urinal, it will be understood that I do not limit myself thereto as I may adapt the pan to any type or form of urinal without departing from the general structure of the device and without a sacrifice of any of its advantages.

Having fully described my invention, what I claim as new, and desire to secure by Letters Patent, is:—

As an article of manufacture, for use in a urinal having a feed pipe, a drain pipe, and a nosing bead, a pan comprising a central perforated portion, rear, side and front converging imperforate portions, said side portions being adapted to rest beneath said bead and said front portion being adapted to rest thereover, and a holder for disinfectants having a central porforated portion and imperforate converging portions suspended beneath the perforated portion of said pan.

GEORGE A. SLEIGHT.

Copies of this patent may be obtained for five cents each, by addressing the "Commissioner of Patents, Washington, D. C."